Patented Dec. 12, 1933

1,939,216

UNITED STATES PATENT OFFICE 1,939,216

CHEMICAL TREATMENT OF ORGANIC ACID HALIDES

Lucas P. Kyrides, St. Louis, Mo., assignor, by mesne assignments, to Monsanto Chemical Company, a corporation of Delaware No Drawing. Application January 21, 1931
Serial No. 510,279

5 Claims. (Cl. 260—123)

This invention relates to the manufacture of alkyl chlorides, such as methyl chloride, ethyl chloride, butyl chloride, etc., according to which acid chlorides, particularly the acid chlorides of polycarboxylic acids which have a tendency to form inner anhydrides, such as phthalyl chloride, chlorphthalyl chloride and succinyl chloride or, if desired, fumaryl chloride, benzoyl, chlorbenzoyl chloride, etc., are caused to react with esters of alkyl alcohols preferably in the presence of a small quantity of a metallic salt such as zinc chloride, aluminum chloride, et al. to form the alkyl chloride and the anhydride corresponding to the acid chlorides. An embodiment of the invention may be represented structurally as follows:

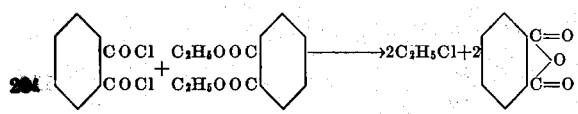

The following examples illustrate the application of the principles of my invention:

Example 1.—Forty (40) parts of phthalyl chloride are heated with thirty-eight (38) parts of di-ethyl phthalate together with a trace (approximately .2% by weight of the mixture) of anhydrous zinc chloride. The reaction commences at approximately 130° and is accelerated by raising the temperature. The ethyl chloride distills off and may be condensed and collected in the usual manner; a yield of more than eighty-five percent of the theory is thus obtainable. If no catalyst or promoter is employed, the mixture must be heated to a substantially higher temperature before reaction commences.

Example 2.—Substitute forty-eight (48) parts of benzoyl chloride in the above example for the phthalyl chloride. A substantially higher temperature will be found necessary to complete the reaction. The ethyl chloride distills over in the same manner as described in the previous example.

Example 3.—Ethyl benzoate may be substituted in Example 1 for the di-ethyl phthalate, the molar proportion of the ethyl benzoate to phthalyl chloride being approximately 2.0 to 1.1. The reaction commences at approximately 180° C. and proceeds at 180° C. to 200° C., ethyl chloride being distilled over and collected.

Example 4.—Normal butyl chloride may be prepared in a manner analogous to ethyl chloride by substituting di-normal butyl phthalate for the di-ethyl phthalate and otherwise proceeding as described in Example 1. The reaction commences at 120°. A slight excess of phthalyl chloride may be employed advantageously. An eighty-five percent yield is easily obtained.

Example 5.—Secondary butyl chloride in good yield, may be prepared in a manner analogous to that set forth in the previous example for the manufacture of the normal butyl chloride. The di-secondary butyl ester of succinic acid is caused to react with a slight excess of succinyl chloride. When a small amount of zinc chloride is employed, the reaction commences at approximately 110° and may be accelerated by raising the temperature of the mixture.

Substantially improved yields are obtained when acid chlorides of carboxylic acids are employed, which have a tendency to form inner anhydrides. However, the alkyl chloride is obtained using other acid chlorides. In most of the examples hereinabove enumerated, the acid radicals of the acid chloride and of the ester are the same, thus resulting in a single anhydride by-product which is recoverable. It is to be noted, however, that one may employ an ester of one acid and an acid chloride of another acid, if so desired.

Various acid chlorides may be employed. These include preferably the dicarboxylic acid chlorides, such as phthalyl chloride, chlorphthalyl chloride, succinyl chloride, fumaryl chloride, as well as the monocarboxylic acid chlorides, such as benzoyl chloride, chlorbenzoyl chloride, etc. Similarly, various esters may be employed including the di-alkyl esters of phthalic acid, chlorphthalic acid, succinic acid, fumaric acid, maleic acid, benzoic acid and others. When relatively volatile reacting ingredients are employed, pressure may be applied advantageously in order to attain a reacting temperature.

The phthalic anhydride which results may be converted again into phthalyl chloride by causing the same to react with benzotrichloride, phosphorus chloride, etc. The zinc chloride which is present, and may be used repeatedly, facilitates the later reaction, and the resulting mixture can be used without purification for the preparation of additional thionyl chloride. Such a mixture will contain benzoyl chloride, phthalyl chloride together with a small amount of unreacted phthalic anhydride and possibly some benzotrichloride. By employing higher temperatures and with the aid of pressure, if necessary, a benzotrichloride may be employed alone.

In lieu of the acid chlorides which have been described throughout the specification, one may prepare other corresponding halogen derivatives, including the bromides in an analogous manner.

What I claim is:

1. The method of manufacturing an alkyl halide and a corboxylic acid anhydride which comprises causing an alkyl ester of an unsubstituted corboxylic acid to react with a carboxylic acid halide.

2. The method as defined in claim 1 wherein the reaction is caused to proceed in the presence of a metallic chloride.

3. The method as defined in claim 1 wherein the acid halide is a dicarboxylic acid halide capable of forming an inner anhydride.

4. The method as defined in claim 1 wherein the acid radical of the acid halide and the acid radical of the ester are the same.

5. The method that comprises reacting a carboxylic acid chloride and an alkyl ester of an unsubstituted carboxylic acid at a temperature whereby an alkyl halide and the corresponding carboxylic acid anhydride are formed.

LUCAS P. KYRIDES.